Aug. 18, 1970  D. E. MINDT  3,524,229
ADJUSTABLE ROPE BRAKE
Filed Nov. 8, 1968

INVENTOR
DELTON E. MINDT

Patent 3,524,229 — Adjustable Rope Brake

3,524,229
ADJUSTABLE ROPE BRAKE
Delton E. Mindt, Box 105, Chester, Mont. 59522
Filed Nov. 8, 1968, Ser. No. 774,390
Int. Cl. F16g 11/00
U.S. Cl. 24—132      2 Claims

ABSTRACT OF THE DISCLOSURE

A cleat attachable upon a rope in adjustable position for holding the rope securely around an object and to prevent slipping off, the device comprising a pair of sleeves in axial alignment with each other and secured beneath a base, a brake shoe lever being positioned between the sleeves, the brake shoe lever being mounted pivotly free on a transverse pin, the brake shoe lever comprising a brake shoe of semicylindrical shape to fit partly around the rope extending through the sleeve, and the base having a generally angle configurated arm on the upper side of the base, the rope being passed through a space between the arm and the brake shoe lever which thus binds the same.

---

This invention relates generally to rope securing devices.

A principal object of the present invention is to provide an adjustable rope brake which serves to secure opposite ends of a rope around an object without the necessity of tying a knot therein.

Another object of the present invention is to provide an adjustable rope brake which is particularly adaptable for use by hunters, fishermen, boatmen and the like.

Still another object of the present invention is to provide an adjustable rope brake wherein the greater the tension of the rope against the brake, the more firmly the brake will hold the rope.

Yet another object of the present invention is to provide an adjustable rope brake which includes only one moving part so that the same is less likely to wear out over a repeated long use.

Other objects of the present invention are to provide an adjustable rope brake which is simple in design, inexpensive to manufacture, rugged in construction, easy to use and efficient in operation.

These and other objects will be readily evident upon a study of the following specification together with the accompanying drawing wherein:

FIG. 1 is a side elevation view of the present invention; and

FIG. 2 is a cross-sectional view taken on the line 2—2 of FIG. 1.

Referring now to the drawing in detail, the reference numeral 10 represents an adjustable rope brake, according to the present invention wherein there is a main member or main body 11 comprised of an elongated base 12 having a pair of spaced apart sleeves 13 and 14 in axial alignment with each other. The sleeves are secured to the base 12 integrally, the base having a transverse pin 15 extending therethrough between the opposite ends of which a brakeshoe lever 16 is pivotally attached upon the pin. The brakeshoe lever has a brakeshoe 17 which is located between the sleeves 13 and 14, the brakeshoe being of generally semicylindrical configuration so as to fit around approximately one-half of the rope 18 positioned between the sleeves.

It is to be noted that the pin 15 extends through the brakeshoe lever relatively close to one end thereof so that the opposite end of the brakeshoe lever is movable downwardly against the rope so to apply pressure thereto.

The main body member 11 further includes an integral support arm 19 formed upon the opposite side of the base to which the sleeves are formed, the support arm forming a throat 20 between the lower edge 21 of the support arm and the upper edge 22 of the brakeshoe lever.

A spring clip 23 is secured by means of screws 24 or the like to one end of the support arm, as shown in FIG. 1 of the drawing.

In operative use, the rope 18 is first threaded from the right toward the left through the sleeve 13 then around the brakeshoe and through the right end of the sleeve 14 and leftward therethrough, the rope then being fitted around an object 25 to which it is intended to be secured, the rope then being fitted through the throat 20 and the terminal end of the rope being snapped under the spring clip 23 so as to be out of the way. Upon a force applied against the rope such force comprising a pulling force from the direction of the object 25 being secured will cause the rope in the throat 20 to bear downwardly against the brakeshoe lever 16 so to cause the brakeshoe 17 to depress the rope between the sleeves out of alignment therewith and thus rigidly hold the position of the rope as applied. Thus the rope is thoroughly wedged in position so to securely hold against accidental slipping out. By giving a quick jerk in the direction of the solid object the device may be easily applied. With intention, the rope may be easily and effortlessly detached from around the object when desired. It is of course understood that the adjustable rope brake may be positioned anywhere along a length of rope so as to fit around various size of objects. It is of course further understood that the adjustable rope brake may be made in various sizes so as to accommodate different size ropes.

While various changes may be made in the detailed construction, it is understood that such changes will be within the spirit and scope of the present invention.

I claim:

1. In an adjustable rope brake, the combination of a main body member, a brake shoe lever, said brake shoe lever being pivotly attached respective to said main body member, and means for detachably securing a rope adjustably in said brake, said main body member comprising an elongated base, a plurality of spaced apart sleeves integral with said base, said sleeves being in alignment axially with each other, and said base having a support arm extending from an opposite side of said base, said arm comprising a member having a portion thereof in spaced relation from said base so to form a throat between said support arm and said base, said brake shoe lever comprising a member having a portion thereof extending between said sleeve, said brake shoe lever being mounted pivotly free about a transverse extending pin secured in said base, and said brake shoe lever having a cylindrically configurate portion between said sleeves for being fitted against a side of a rope extending through said sleeves, said throat comprising a space into which said rope may be threaded for bearing against one end of said brake shoe lever so to cause said brake shoe to bear out against said rope and cause said rope to be bent out of alignment with said sleeves for securement.

2. The combination as set forth in claim 1 wherein a spring clamp is secured to one end of said support arm for purpose of holding a loose end of said rope.

References Cited
UNITED STATES PATENTS

| | | | |
|---|---|---|---|
| 454,760 | 6/1891 | Osborne | 24—134 |
| 796,143 | 8/1905 | Nord. | |
| 1,066,751 | 7/1913 | Park | 24—134 |
| 1,260,583 | 3/1918 | Schwartz. | |
| 1,516,564 | 11/1924 | Cans | 188—65.5 X |
| 2,460,640 | 2/1949 | Jensen | 24—134 X |
| 2,776,044 | 1/1957 | Presti. | |

BERNARD A. GELAK, Primary Examiner

U.S. Cl. X.R.

24—134